(12) United States Patent
Kasahara et al.

(10) Patent No.: US 7,886,361 B2
(45) Date of Patent: Feb. 8, 2011

(54) STORAGE-MEDIUM PROCESSING METHOD, STORAGE-MEDIUM PROCESSING DEVICE, AND PROGRAM

(75) Inventors: Akihiro Kasahara, Sanbu-gun (JP); Akira Miura, Sagamihara (JP); Hiroshi Suu, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 839 days.

(21) Appl. No.: 11/571,716

(22) PCT Filed: Jun. 8, 2005

(86) PCT No.: PCT/JP2005/010481

§ 371 (c)(1),
(2), (4) Date: Feb. 2, 2007

(87) PCT Pub. No.: WO2006/006326

PCT Pub. Date: Jan. 19, 2006

(65) Prior Publication Data

US 2007/0248231 A1 Oct. 25, 2007

(30) Foreign Application Priority Data

Jul. 8, 2004 (JP) ............................. 2004-202126

(51) Int. Cl.
*H04L 29/00* (2006.01)
(52) U.S. Cl. ........................................ 726/26; 380/277
(58) Field of Classification Search ................... 726/26; 380/277
See application file for complete search history.

(56) References Cited

U.S. PATENT DOCUMENTS

| | | | |
|---|---|---|---|
| 6,981,147 B1 * | 12/2005 | Hamann et al. | 713/175 |
| 2002/0120465 A1 * | 8/2002 | Mori et al. | 705/1 |
| 2002/0152352 A1 * | 10/2002 | Ikegai et al. | 711/108 |
| 2003/0130952 A1 * | 7/2003 | Bell et al. | 705/51 |
| 2010/0008500 A1 * | 1/2010 | Lisanke et al. | 380/201 |

FOREIGN PATENT DOCUMENTS

| | | | |
|---|---|---|---|
| JP | 2001-344216 | | 12/2001 |
| JP | 2002-099514 | | 4/2002 |
| JP | 2002099514 A | * | 4/2002 |
| JP | 2002-259223 | | 9/2002 |
| JP | 2003-022339 | | 1/2003 |
| JP | 2003-174439 | | 6/2003 |
| JP | 2003174439 A | * | 6/2003 |
| JP | 2003-186755 | | 7/2003 |
| JP | 2003-242040 A | | 8/2003 |
| JP | 2004-139473 A | | 5/2004 |
| WO | WO 0237222 A2 | * | 5/2002 |

* cited by examiner

*Primary Examiner*—Carl Colin
(74) *Attorney, Agent, or Firm*—Oblon, Spivak, McClelland, Maier & Neustadt, L.L.P.

(57) ABSTRACT

Rental business of content data is adequately performed while preventing a improper use of rights or the like by a user. Rental user key data Kuren1-3, and rental content key data Kuren1-3 includes management metadata M1-M3 and M1'-M3', respectively. The management metadata includes data use termination date/time indicating an expiration date or the like.

13 Claims, 9 Drawing Sheets

FIG. 3

Kureni (Mi)  Use Start
      Date/Time
      Use Termination
      Date/Time

Kcreni (Mi')  Use Start Date/Time
       Use Termination
       Date/Time
       Maximum Reproduction
       Number
       Maximum Offline
       Reproduction Number
       Reproduction Number
       Offline Reproduction
       Number
       Latest Usage Date/Time
       Contradiction Information

FIG. 4

Access on June 6th

Kuren1 (M1 (6/7))
Kuren2 (M2 (6/10))
Kuren3 (M3 (6/13))

Access on June 8th

~~Kuren1 (M1 (6/7))~~  [Delete]
Kuren2 (M2 (6/10))
Kuren3 (M3 (6/13))

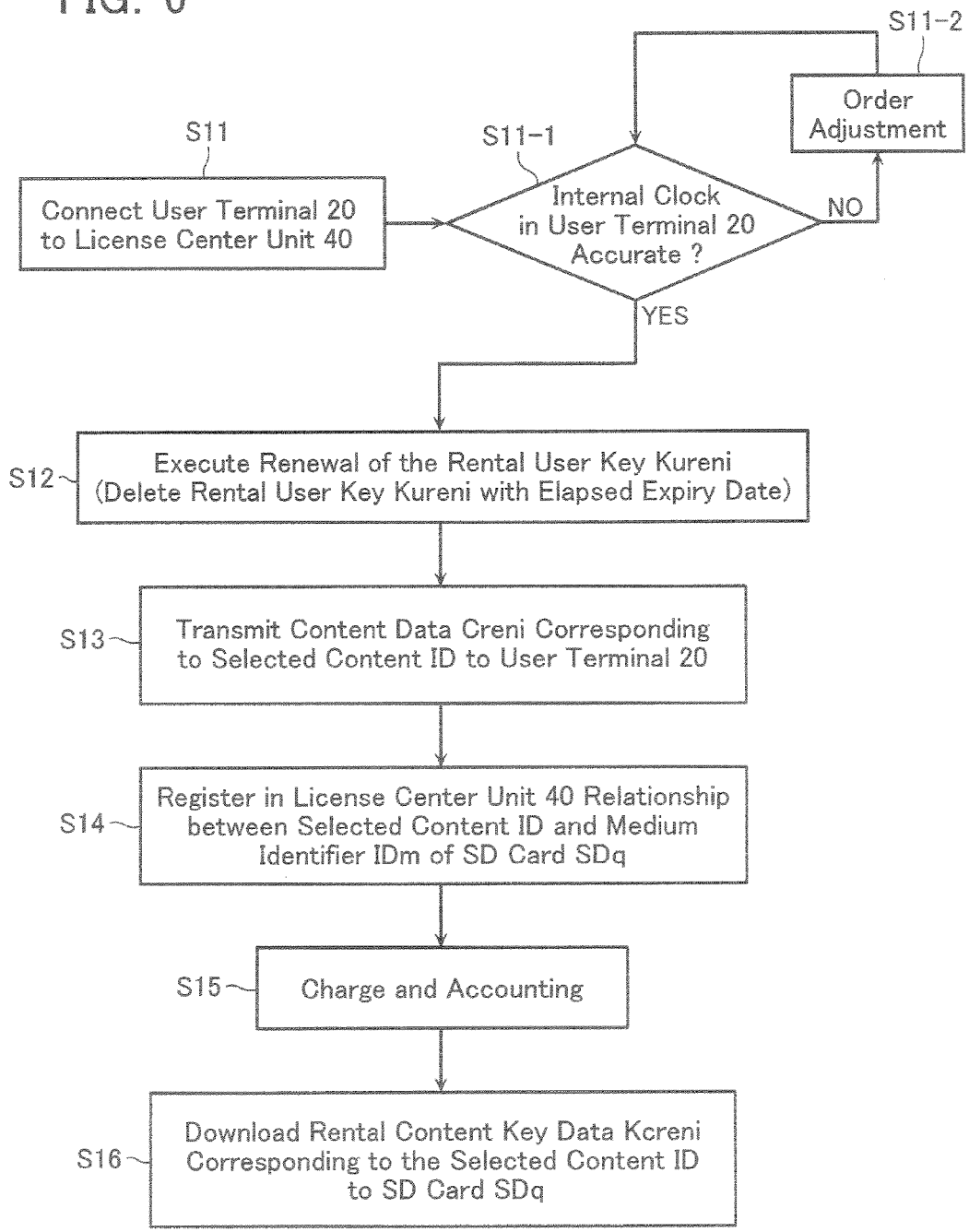

STORAGE-MEDIUM PROCESSING METHOD, STORAGE-MEDIUM PROCESSING DEVICE, AND PROGRAM

FIELD OF THE INVENTION

The present invention relates to a storage-medium processing method a device, and a program, which enables a user terminal to acquire content data and so forth from a license center apparatus, by online-connecting a storage medium with a double key encryption scheme via the user terminal to the license center apparatus.

BACKGROUND OF THE INVENTION

In recent years, with development of information society, a content data distribution system is widely used. In this system, the content data including electronic data such as a book, newspaper, music, or an moving pictures, is distributed to a user terminal, which enables browsing of content data in the user terminal.

However, since electric content data (heretofore, it is referred to as "content data") can be copied easily, the electronic content data tends to induce illegal acts that disregard copyright. From a viewpoint of protecting content data from such an illegal act, content data is encrypted and recorded by the encryption key and is usually decoded at the time of reproducing.

Content data protection technologies like this include CPRM (content Protection for Prerecorded Media) which uses a standardized encryption key scheme in SD audio, SD video, SD E-e-Publish (SD computer-assisted publishing) or the like (for example, refer to nonpatent literature 1). The encryption-key scheme adapted in this nonpatent literature 1 is an encryption single key scheme that encrypts a title key with a medium unique key. On the other hand, the encryption double key scheme in which the content key is doubly encrypted with the user key and the medium unique key is known (for example, refer to nonpatent literature 2). This kind of encryption double key scheme is used in MQbic®, for example.

FIG. 10 is a schematic diagram showing the configuration of the SD card corresponding to the encryption double key scheme adopted in Mqbic. An SD card SDq is an example of a secure storage medium that securely stores data. The SD card SDq has a system area 1, a hidden area 2, a protected area 3, a user data area 4, and an encryption/decryption unit 5, and the data is stored in each area 1-4.

In a SD card SDq like this, key management information MKB (Media Key Block) and the medium identifier IDm are stored in the system area 1. The medium unique key Kmu is stored in the hidden area 2. The encrypted user key Enc (Kmu, Ku) is stored in the protection area 3, and the encrypted content key data Enc (Ku, Kc) is stored in the user data area 4. The expression of Enc (A, B) means the data B encrypted with data A in this specification. Here, the user key Ku is encryption/decryption key to the content key Kc, and is used in common also to two or more sets of encrypted content key data Enc (Ku, Kc1), Enc (Ku, Kc2) . . . . Moreover, the subscript q of SD card SDq denotes that it conforms to MQbic®.

Here, the system area 1 is a read-only area which can be accessed from outside of the SD card. The hidden area 2 is a read-only area that the SD card itself refers to, and cannot be accessed at all from external. The protection area 3 is an area in which data read and write is possible from external of the SD card when authentication is accomplished.

The user data area 4 is an area in which read/writing is freely possible from outside of the SD card. The encryption/decryption unit 5 performs authentication, key exchanging and cryptography, and has a function of encryption/decryption.

The user terminal $10q$ for reproducing operates logically as follows to such the SD card SDq. That is, the user terminal $10q$, performs MKB processing of the key management information MKB read from the system area 1 of SD card SDq with the device key Kd set up beforehand (ST1), to obtain a medium key Km. Next, the user terminal $10q$ carries out the hash processing of both the medium key Km and the medium identifier IDm read from the system area 1 of the SD card SDq (ST2), and obtains the medium unique key Kmu.

Thereafter, the user terminal $10q$ performs, based on the medium unique key mu, an authentication process and a key exchanging process (AKE: Authentication Key Exchange) with the decryption/encryption unit 5 of the SD card SDq, to share a session key Ks with the SD card SDq (S3).

Note that the authentication and key exchanging process in the step ST3 succeeds when the medium unique key Kmu in the hidden area 2 referred to at the decryption/encryption unit 5 coincides with the medium unique key Kmu generated by the user terminal $10q$, thereby the session key Ks being shared.

Then, the user terminal $10q$ reads out the encrypted user key Enc (mu, Ku) from the protection area 3, through a cipher communication using the session key Ks (S4). This results in the encrypted user key Enc (Kmu) being decrypted by the medium unique key Kmu (S5). Then, the user key Ku will be obtained.

Finally, when the encrypted content key Enc (Ku, Kc) is read from the user data area 4 of the SD card SDq, the user terminal $10q$ carries out the decryption processing of the encrypted content key Enc (Ku, Kc) with the user key Ku to obtain a content key Kc(ST$5q$). Finally, when the encrypted content data Enc (Kc, C) is read from Memory $11q$, the user terminal $10q$ performs the decryption processing of the encrypted content data Enc (Kc, C) with the content key Kc (ST6). Thereby, the user terminal $10q$ reproduces the obtained content data C.

Note that although the above-mentioned example stores encrypted content data in the memory $11q$ of the user terminal $10q$, it may be stored in the external storage medium.

The above-mentioned encryption double key scheme stores encrypted content key data at the user data area 4 having a large memory capacitance compared to the protection area 3. Therefore, it has an advantage in that it can store a lot of encrypted content key data compared to encryption single key scheme.

Moreover, since the encryption double key scheme may store encrypted content data in the SD card, it may urge the distribution of encrypted content data.

Furthermore, in the encryption double key scheme, the medium identifier as an identifier is given to each SD card, and a unique user key (a medium unique key) is issued per medium ID. This user key is also encrypted by the medium unique key, and is stored in the protection area (protected area) of an SD card. Encryption of the user key depends on the medium identifier, and the user key can be decoded only with an authentic player. For this reason, content data cannot be acquired even if a trespasser copies only a content key unjustly from a user data area.

[Nonpatent literature 1] 4C An entity, LLC, [online], Internet <URL:http://www.4 Centity.com/, searched on Jun. 14, 2004>

[Nonpatent literature 2] IT information site and ITmedia news [online],

Internet<URL:http://www.itmedia.co.jp/news/0307/18/njbt_02.html, searched on Jun. 14, 2004>

DISCLOSURE OF THE INVENTION

Problem to be Solved

As mentioned above, the user key Ku is used in common also for two or more encrypted content keys Enc (Ku, Kc1, Enc (Ku, Kc2), in the same SD card SDq.

By the way, when thinking that you will begin content data rental services in such a content data distribution system, it is necessary to strictly manage a rental period or the like of content data and establish a system for eliminating improper use thereof exceeding a rental period.

However, the conventional system uses only one user key it is expected that it is difficult to properly execute content data rental business with one user key while preventing improper use of rights by users, for example.

SUMMARY OF THE INVENTION

A storage medium processing method according to the invention uses a storage medium and a user terminal. The storage medium stores medium identifier data, medium unique key data enabled to be generated based on the medium identifier data encrypted user key data in which user key data is encrypted so that it may be decrypted using the medium unique key data, and encrypted content key data in which content key data is encrypted so that it may be decrypted using the user key data. The user terminal to which the storage medium is able to be connected retains encrypted content data in which content data is encrypted so that it may be decrypted using the content key data. The user terminal connected to the storage medium is enabled to access to a license center to obtain various kinds of data. The method comprises: an issuance step issuing the content key data and the user key data with management data including data of an expiration date of the content key data or the user key data in order to permit the user to use the content data before a certain expiration date in response to request from the user terminal; a judgment step judging whether or not the user key data or the content key data may be used continuously referring to the management data; and deleting/use-precluding step deleting or preclude using of the user key data or the content key data based on the judgment result of the judgment step.

A storage medium processing device according to the present invention may be connected to a storage medium which stores medium identifier data, medium unique key data enabled to be generated based on the medium identifier data, encrypted user key data in which user key data is encrypted so that it may be decrypted using the medium unique key data, and encrypted content key data in which content key data is encrypted so that it may be decrypted using the user key data. It performs data processing of the storage medium via a user terminal retaining encrypted content data in which content data is encrypted so that it may be decrypted using the content key data.

The device comprises a key issuance unit issuing the content key data and the user key data with management data including data of an expiration date of the content key data or the user key data in order to permit the user to use the content data before a certain expiration date in response to request from the user terminal, and judgment unit judging whether or not the user key data or the content key data may be used continuously referring to the management data, and conduct an instruction to delete the user key data or the content key data or preclude using of the user key data or the content key data when the continuous usage thereof is judged improper.

A storage medium processing program according to the invention uses a storage medium and a user terminal. The storage medium stores medium identifier data, medium unique key data enabled to be generated based on the medium identifier data, encrypted user key data in which user key data is encrypted so that it may be decrypted using the medium unique key data, and encrypted content key data in which content key data is encrypted so that it may be decrypted using the user key data. The user terminal to which the storage medium is able to be connected retains encrypted content data in which content data is encrypted so that it may be decrypted using the content key data. The user terminal connected to the storage medium is enabled to access to a license center to obtain various kinds of data. The program is configured to perform: an issuance step issuing the content key data and the user key data with management data including data of an expiration date of the content key data or the user key data in order to permit the user to use the content data before a certain expiration date in response to request from the user terminal; a judgment step judging whether or not the user key data or the content key data may be used continuously referring to the management data; and deleting/use-precluding step deleting or preclude using of the user key data or the content key data based on the judgment result of the judgment step.

THE ADVANTAGE OF THE INVENTION

According to the present invention, propriety of continuous usage of the content key data and the user key data is judged by referring the management metadata. Therefore, it is possible to properly execute content data rental business while preventing improper use of rights or the like by users.

EMBODIMENTS

Hereafter, embodiments of the present invention will now be described with reference to the drawings.

FIG. 1 is a diagram showing the configuration of the storage-medium processing system according to the embodiment of the present invention. The same numerals are given to the same parts as FIG. 10, and detailed explanation is omitted for these parts. Different parts are hereafter mainly described.

Specifically, in the system of this embodiment, a user terminal 20, holding an SD card SDq freely attachable and detachable therein, is enabled to communicate through a network 30 to a license center unit 40. The various data stored in the SD card SDq is explained with reference to FIG. 2. Not only one user key Ku but plural kinds of user key data Ku are stored in this SD card SDq, according to the types of content data or the like. The plural user keys are encrypted with the medium unique key Kmu and stored in the protection area 3. In this embodiment, the user key data Ku is divided into two types: user key data Kuren for content data rental (hereinafter referred to as rental user key data Kuren); and user key data Kusell for content data sale (hereinafter referred to as the for-sale user key data Kusell).

Furthermore, the rental user key data Kuren can be separately provided for various kinds of common characteristics. In this embodiment, the rental user key data Kureni (i=1, 2, 3...) is provided on one-by one basis for different content data Creni for rent (i=1, 2, 3...) (or for different content key data Kcreni).

Each rental user key data Kuren 1-3 contains management metadata M1, M2, M3, respectively. Moreover, the corresponding content key data Kcren 1-3 contains management metadata M1', M2', M3', respectively.

Content of the management metadata M1-M3, M1'-M3' is explained using FIG. 3. The management metadata Mi (i=1, 2, 3...) contained in the rental user key data Kureni contains the data concerning (1) a use start date/time, and (2) a use-termination date/time of the corresponding content data Creni. These kinds of data do not have such characteristics that need an update thereof. Accordingly, rewrite thereof is not performed. If necessary, in order to prevent falsification or the like, well-known falsification prevention technique (for example, embedded digital-watermarking technique) may be used.

On the other hand, like the management metadata Mi, management metadata Mi' (i=1, 2, 3...) contained in the content key data Kcreni includes (1) a use start date/time, and (2) a use-termination date/time of the corresponding content data Creni.

Additionally, it contains the following data:

(3) The maximum number of reproducing (the upper limit: how many times content data Creni can be reproduced);

(4) The maximum number of off-line reproducing (the uppermost limit: how many times content data Creni can be reproduced in a state in which the user terminal 20 and the license center 40 are not connected (offline state));

(5) a number of reproducing (how many times content data Creni has been reproduced);

(6) a number of offline reproducing (how many times content data Creni has been reproduced in an offline state);

(7) The latest usage date/time (the latest date/time content data Creni was reproduced, regardless online or offline); and (8) Contradiction information (the existence or nonexistence of contradiction information (described later in detail).

Out of above-described data, at least (5)-(8) is rewritten sequentially according to situation of reproducing content data Creni.

Note that types of data stored as management metadata Mi' are not limited to the above-mentioned ones. For example, instead of (6) a number of off line reproducing, or in tandem with this, data of "offline reproducing duration" indicating a reproducing duration in an offline state.

In addition, the for-sale user key data Kusell can be used in common for plural kinds of for-sale content key data Kcselli (i=1, 2, 3...)]. Of course, like the rental user key data Kuren, it is also possible to provide different kinds of for-sale user key data Kcsell per content data or per dealer or the like. Since the for-sale content data and its key have little to do with the main point of the present invention, detailed explanation thereof is omitted hereinbelow. Note that although explanation is made in the embodiment that management metadata is not added to the for-sale user key Kusell and the for-sale content key Kcselli, similar metadata may be added for product management or the like, needless to say.

Returning to FIG. 1, the user terminal 20 is equipped with a memory 21, a download unit 22, an SD card processing unit 23 and a control unit 25 for example. For a user terminal 20, any arbitrary device may be used, if it is an electronic instrument holding a SD card SDq attachable and detachable therein such as a personal computer, a portable cellular phone, or a portable information terminal (personal digital assistant).

The memory 21 is a memory area that may be read and written from another unit 22-25. For example, the rental content data Enc (Kcreni, Creni) which is encrypted, and for-sale content data Enc (Kcselli, Cselli) are stored therein.

The download unit 22 is controlled by the control unit 25, and it has a function of downloading the encrypted content key data Enc (Ku, Kc) and user keys from the license center unit 40. For example, browser software or the like may be used therefor. The SD card processing unit 23 is controlled by the control unit 25, and has a function of authentication toward a SD card SDq, a cipher communication, and reading/writing/erasing data stored in each of the areas 1, 3, and 4. The control unit 25 has usual computer functions and a function of controlling each of the units 21-24 according to operation of a user.

The license center unit 40 comprises a host computer 41, a medium identifier database 42, a user key database 43, a content key database 44, a management information database 45, and an authenticated content ID database 47.

The host computer 41 receives from the user terminal 20 through a network 30 a request of transmitting a content key. In this case, after experiencing a certain authentication process, the host computer 41 serves as a content key issuance unit that generates new content key data concerning the request, and transmits the new content key data or the like to the user terminal 20 through a network 30.

Moreover, when a user key delivery request is received from the user terminal 20 through the network 30, the host computer 41 serves as a user key issuance unit that accesses the databases 42 or the like to generate user key data concerning the request, and transmits the user key data or the like to the user terminal 20 via the network 30. Moreover, it serves as a judgment unit for judging the propriety of continuous usage of the rental user key data Kureni and the rental content key data Kcreni which the SD card SDq holds, referring to the management metadata Mi'.

The medium identifier database 42 holds the data of the medium identifier data IDm which each SD card has. The user key database 43 is for storing data of various kinds of the user key data which each SD card SDq has.

The content key database 44 holds various kinds of content key data. The management information database 45 is for holding the above-described management metadata M1-M3, M1'-M3'.

The authenticated content ID database 47 holds content IDs of the content data issued according to the request of a user of the user terminal 20, in relation to the medium identifier IDm of the SD card SDq inserted in the user terminal 20.

The security module 51 is a unit that performs encryption/decryption processing of the user key Ku and the content key Kc, and is equipped with the management key obtaining unit 52, and the key encryption management unit 53.

The management key obtaining unit 52 holds the management key readable from the host computer 41.

The key encryption management unit 53 has a function of receiving a setup of a management key by the host computer 41, decoding the encrypted user key for management and the encrypted content key for management respectively, which are received from the host computer 41 based on the management key to obtain a user key and a content key, encrypting the content key and basic metadata with the user key, and transmitting to the host computer 41 the encrypted content key (with basic metadata included therein) obtained and (additional) metadata such as a purchase date or the like.

Next a storage-medium processing method conducted by the storage-medium processing system constituted as mentioned above is explained, using FIGS. 4 to 7.

The process of performing deletion process of the rental user key data Kureni whose expiration date has been elapsed, using data of "a use termination date/time" in the management metadata Mi, Mi', is explained with reference to FIG. 4.

It is assumed that, as an example, on June 6, the user terminal 20 accesses the license center unit 40, and rental user key data Kuren1, Kuren2, and Kuren3 is stored in the SD card SDq. It is assumed that the data (a part of management metadata Mi') of "a use termination date/time" of the rental user key Kuren1, Kuren2, and Kuren3 is on June 7, June 10, and June 13, respectively.

And let it suppose that the user terminal 20 accesses the license center unit 40 again on June 8, or two days after June 6. In this case, the license center unit 40 detects that the use termination date/time of the rental user key data Kuren1 has elapsed, using the data of "a use termination date/time" in the management metadata Mi, Mi' stored in the management information database 45 or the like. Then, it transmits a deletion instruction of the rental user key data Kuren1 to the SD card processing unit 23. The SD card processing unit 23 deletes this rental user key data Kuren1 based on this deletion instruction. At this time, it is also possible to delete simultaneously corresponding content key data Kcren1 and content data Cren1.

As described above, it is profitable that the management metadata Mi including the expiration date (a use-termination date/time) is included not only in the rental content key Kreni but also in the rental user key Kureni. It has the following merit.

Even when the management metadata Mi' is included only in the rental content key data Kcreni, the license center unit 40 can perform deletion of the rental content key data Kcreni when the expiration date elapsed to prevent improper use of the content data thereafter. However, when the user conducts a backup copy of the rental content key data Kcreni in another medium, an improper use of the rental content data after the expiration date may occur.

Like the above-mentioned embodiment, the management metadata Mi, Mi' may be included in both in the rental content key Kcreni and in the rental user key Kureni. Thereby such improper use can be prevented. Because in this case, even if the rental content key data Kcreni that was subjected to backup copy is returned to the SD card SDq, the corresponding rental user key data Kureni is already deleted at that time because of elapsing of the expiration date. It is still theoretically possible to continue improper use by preparing a different SD card for every content data to avoid the deletion of the rental user key data. However, considering the price of the SD card itself or the like, such an act will not pay. Therefore, it is thought that the above-mentioned way can substantially prevent improper use of the content data for rent.

Next, a method of preventing the improper use of the content data using data of "a use start date/time", data of "a use-termination date/time", and data of "the latest usage date/time" in the management metadata Mi and Mi', is explained using FIG. 5. This method is effective to prevent a user from improperly lengthening a useable period by putting back the date of the clock in the user terminal 20 by a number of days, and reproducing content data off-line.

Specifically, at the time of the first reproduction of the rented content data it may be reproduced at the arbitrary time between the use start date/time and use-termination date/time (refer to FIG. 5 (*a*)). If this reproduction is performed, the reproduction date/time will be stored as "latest usage date/time" of management metadata M1'.

Then, at the time of the next second reproduction, the content data may be used during a limited time: that is, time between the "latest usage time/date" and the "use-termination date/time" (reproduceable time Tp) (refer to this FIG. 5(*b*)). When this second reproduction is performed, the time of the second reproduction is renewed and recorded as the "latest usage date/time". The next reproduceable time will be between the updated "latest usage date/time" and the "use-termination date/time". In this way, as the reproduction is repeated, the reproduceable time Tp becomes short. For this reason, even if a user is trying to operate the clock of the user terminal 20 unfairly and use the content data for rent unjustly, it becomes difficult gradually to set up a clock between this limited reproduceable time Tp. When the clock is accidentally set up out of the reproduceable time Tp, the SD card processing unit 23 judges this as "contradiction information", and it is stored in the management metadata Mi' as a contradiction history.

When the contradiction information is recorded, the use of the content data thereafter becomes impossible unless the rental user key Kureni is updated. Thus, the improper use of the content data for rent is restricted.

The internal clock of the user terminal 20 sometimes becomes inaccurate because of the reasons that is out of a user's intention (a blackout, a run-out of a battery, etc.). In this case it is not preferable that the contradiction information is recorded. When the on-line connection of the user terminal 20 is established at license center unit 40, it is suitable that an error of the internal clock of the user terminal 20 is detected, and the error is corrected spontaneously or passively to prevent contradiction information from occurring.

Next, the acquisition process of new content data for rent in the storage medium processing system including the steps for executing the above-mentioned method, and the reproduction process of the content data are explained with reference to a flowchart shown in FIGS. 6 and 7.

First, when the user terminal 20 is connected to the license center unit 40 (S11), the license center unit 40 judges whether the internal clock of the user terminal 20 is exact as compared with the time information of its own (S11-1). When an error of the clock exceeds a tolerable value (NO), the license center unit 40 orders the user terminal 20 to adjust a clock (S11-2). It does not permit the user terminal 20 to acquire content data or the like until calibration of the clock is completed. If there is an error of the internal clock in the user terminal 20, there is a possibility that the data of "latest usage date/time" is not updated appropriately, when the content data for rent is reproduced off-line.

Instead of correcting a clock by a user manually, the user terminal 20 may detect time information owned by the license center unit 40, and correct its internal clock automatically based on this. Alternatively, it is also possible that the internal clock in the user terminal 20 may be a so-called radiowave-controlled clock to skip the process of this S11-1 and 2.

When the internal clock of the user terminal 20 is exact (YES of S11-1), the license center unit 40 updates at least one of the rental user keys Kureni owned by the SD card SDq. In addition, it performs deletion process (refer to FIG. 4) of the rental user key Kureni whose use termination date/time has passed (S12).

Subsequently, the license center unit 40 let the user terminal 20 choose the content ID of the rental content data that is wished to be used as a rental. Then, the license center unit 40 transmits the rental content data Creni corresponding to the specified content ID to the user terminal 20 (S13).

The Relationships between this selected content ID and the medium identifier data IDm of the SD card SDq is registered in the authenticated content ID database 47 in the license center unit 40 (S14).

If the charge and accounting is completed (S15), the rental content key data Kcreni corresponding to the selected content ID is downloaded into the SD card SDq (S16). Above-described management metadata Mi' is added to this rental content key data Kcreni.

FIG. 7 shows the reproduction process of the rental content data Creni acquired in the process shown in FIG. 6. If a user starts the user terminal 20 (S21) the user terminal 20 searches the SD card SDq conforming to MQbic (S22).

When existence of the SD card SDq is not detected (NO of S23), insert of the SD card SDq conforming to MQbic is requested to the user (S24). When Existence of the SD card SDq is detected, (YES of S23), the user terminal 20 searches the content key data Kcreni held in the detected SD card SDq, and display on the display (not illustrated) the name of the content data (S25).

A user operates the operation panel of the user terminal 20 (not illustrated) to choose content data to be executed (reproduced) out of the content data names displayed (S26).

The user terminal 20 specifies the content ID of selected content data, and reads management metadata Mi' corresponding to the content ID from the inside of the SD card SDq (S27).

When the selected content data is for rent, the read management metadata Mi' includes the data of "a use-termination date/time", data of "a number of reproducing" data, data of "a number of offline reproducing" data, and data of "the maximum number of reproducing" data, as mentioned above.

The user terminal 20 judges based on the data whether or not the selected content data for rent is within an expiration date, or the number of reproducing is below the maximum number of reproducing (S28).

When decision is negative (NO), that is, when it is judged that the expiration date is over, or the number of reproducing is over the maximum number of reproducing, the user terminal 20 displays that on the display (not illustrated) (S28-1), and deletes the corresponding rental user key data Kuren (S28-2), and the process returns to S25.

Alternatively, when the number of reproducing is not over the maximum number of reproducing, but close to it a message recommending renewal of rights may be displayed.

When a decision of S28 is affirmative (YES), it is judged whether contradiction history is included in the "contradiction information" data of the management metadata Mi'. If it is included, a message requesting a renewal of rights of the rental user key Kureni is displayed on the display (not shown) of the user terminal 20 (S30).

When the renewal of rights, that is, extension or the like of the expiration date of the rental user key Kureni is accomplished (S31), the process S32 is skipped and it shifts to S33 which is described later.

If a decision of S29 is negative (NO), with reference to the "the number of off-line reproducing" data and the "the maximum number of off-line reproducing" data of the management metadata Mi', it is judged that whether the former is equal to or more than the latter (S32).

When the decision is affirmative, a message requesting a renewal of rights of the rental user key Kureni is displayed on the display (not shown) of the user terminal 20 (S30).

When the renewal of rights i.e., extension or the like of the expiration date of the rental user key Kureni is accomplished (S31), the process shifts to S33 which is mentioned later.

If the decision of S32 is negative (NO) the content data corresponding to the selected content ID is searched from the memory 21 of the user terminal 20 (S33).

When the corresponding content data is not found (NO of S34), insert of the storage medium (for example, digital versatile disc (DVD) etc.) storing the corresponding content data is requested on the display (not shown) of the user terminal 20(S35). When corresponding storage medium are not possessed, the process shown in FIG. 6 is performed to acquire the content data. When the corresponding content data is searched from the memory 21, the rental content key data Kcren corresponding to the selected content ID is read from the user data area 4 of the SD card SDq (S36).

Thereafter, while the rental content data Creni is decoded by the read rental content key data Kcreni and reproduced, the management metadata Mi' is updated (S37).

The updated management metadata M11 is again encrypted using the rental user key Kureni, and is stored in the user data area 4 of the SD card SDq.

Note that when the time of this reproduction is before the time indicated by the data of "the latest usage date/time" in the management metadata Mi' (refer to FIG. 5), the contradiction history is generated. This contradiction history is included in "contradiction information" data to update the management metadata Mi'. Thereby, at the time of next reproduction, a renewal of rights is required in S30, and misuse of the content data for rent is prevented.

In addition, a content ID is specified first and then the rental content key data Kcren corresponding to the content ID is searched in the above described flowchart.

In contrast, the rental content key data Kcren is specified first, and then the content ID corresponding to this may be searched.

In the above-mentioned embodiment a configuration is explained where rental user key data Kureni is provided per rental content key data Kcreni so as to make up an one-on-one relationship. However, for example, as shown in FIG. 8, a rental user key data Kureni may be shared by two or more sets of rental content key data Kcreni (in FIG. 8, i=1-3) each having common "use termination date/time" data as a part of management metadata Mi'.

Moreover in the explanation of the configuration concerning above-mentioned embodiment, when rental user key data or the like with an elapsed expiration date is detected it is subjected to a deletion process. Instead of a deletion process the key data may be changed into a state it cannot be used.

FIG. 9 indicates another scheme for storing management metadata or the like that is different from the examples shown in FIGS. 1 and 2.

In the example shown in this FIG. 9, rental user key Kuren is common for different plural sets of content key data Kcreni. In addition the management metadata Mi is not directly added to rental user key Kuren stored in the protection area 3. The management metadata Mi' is added only the rental content key data Kcreni stored in the user data area 4.

The management of this rental user key Kuren per rental content key data Kcreni is performed by storing above-mentioned management metadata Mi' in the user data area 4 as management metadata confirmation file 6.

Thereby, it is possible to conduct a management per rental content key data in the substantially same way as two or more rental user keys Kuren are prepared.

This management metadata confirmation file 6 includes management metadata Mi' per rental content key data Kcreni and data cli indicating an address (cluster number) where rental content key data Kcreni is recorded.

Judgment of the propriety of continuous usage of the rental content key data Kcreni can be performed by referring to this management metadata confirmation file 6. That is, the judgment may be conducted by a consistence/inconsistence between the cluster number cli in the management metadata confirmation file 6 and the cluster number in which the corresponding rental content key data Kcreni is actually stored.

By referring to information on the cluster number cli contained in the management metadata confirmation file 6, misuse of the content data is prevented. For example, it can prevent a user from committing a misuse of content data by restoring (returning) in the user data area 4 the rental content key data Kcreni which was copied in another storage medium as a backup. Even if it is restored, there is very little chance that content key data will be returned to the same cluster as the time of acquiring right.

Another merit of this scheme is that when the frequency of access to the protection area 3 decreases response speed will be faster, thereby reducing a user's stress.

Moreover, the storage medium in the present invention can be applied not only to an SD card used in the above-mentioned embodiment but also to the MOPASS card (registered mark) having a memory card function and IC card function, for example. By storing in an IC card function unit the management metadata which is rewritten frequently, the response speed is expected to be improved compared with the case where SD card is used.

Note that the process described in each of above-mentioned embodiments can be implemented by a program which can make a computer perform the process. The program can be stored in a storage medium, such as magnetic disks (a floppy (registered mark) disk, a hard disk, etc.), an optical disk (CD-ROM, DVD etc.), a magneto-optical disk (MO), and a semiconductor memory.

Moreover as this storage medium scheme for storing may be of any type, as long as it is a storage medium enabled to store a program readable by a computer.

Moreover, operating system (OS) working on a computer based on an indication of the program installed in the computer from the storage medium, a database management software, and a middleware such as network software, can implement part of the processes for realizing the embodiments.

Furthermore, the storage medium in the present invention is not limited to the medium that is independent of a computer. It may be a storage medium that downloads the program transmitted by a local area network (LAN) or the Internet, etc., and stores or temporarily stores it.

Moreover, a storage medium is not limited to a single one. When the processes in the embodiments are performed by a plurality of media, the media are included in the storage medium according to the present invention. In addition, the medium configuration can be any type.

Note that a computer in the present invention is configured to perform each process in the embodiments based on a program stored in a storage medium. It may have any configurations. For example, it may be a single device such as a personal computer, or a system having a plurality of network-connected computers.

Moreover, a computer in the present invention is not limited to a personal computer, but includes a operation processing device included in a information processing device, and a microcomputer. It includes devices or apparatuses that can realize the function of the present invention by a program.

Note that the present invention is not limited to the above-described embodiments themselves. In a practice phase, their components can be modified and embodied, as long as it does not depart from the spirit thereof. Moreover merging two or more proper components indicated by the above-mentioned embodiments can form various inventions. For example, some components may be deleted from all the components shown in the embodiments. Furthermore, the components employed in different embodiments may be combined suitably.

BRIEF DESCRIPTION OF THE DRAWINGS

FIG. 3 explains content of the management metadata M1-M3, and M1'-M3'.

FIG. 4 explains the process of performing deletion process of the rental user key data Kureni whose expiration date has been elapsed, using data of "a use termination date/time" in the management metadata Mi, Mi'.

FIG. 6 explains an acquisition process of new content data for rent in the storage medium processing system.

AN EXPLANATION OF SYMBOLS

Figure 1:
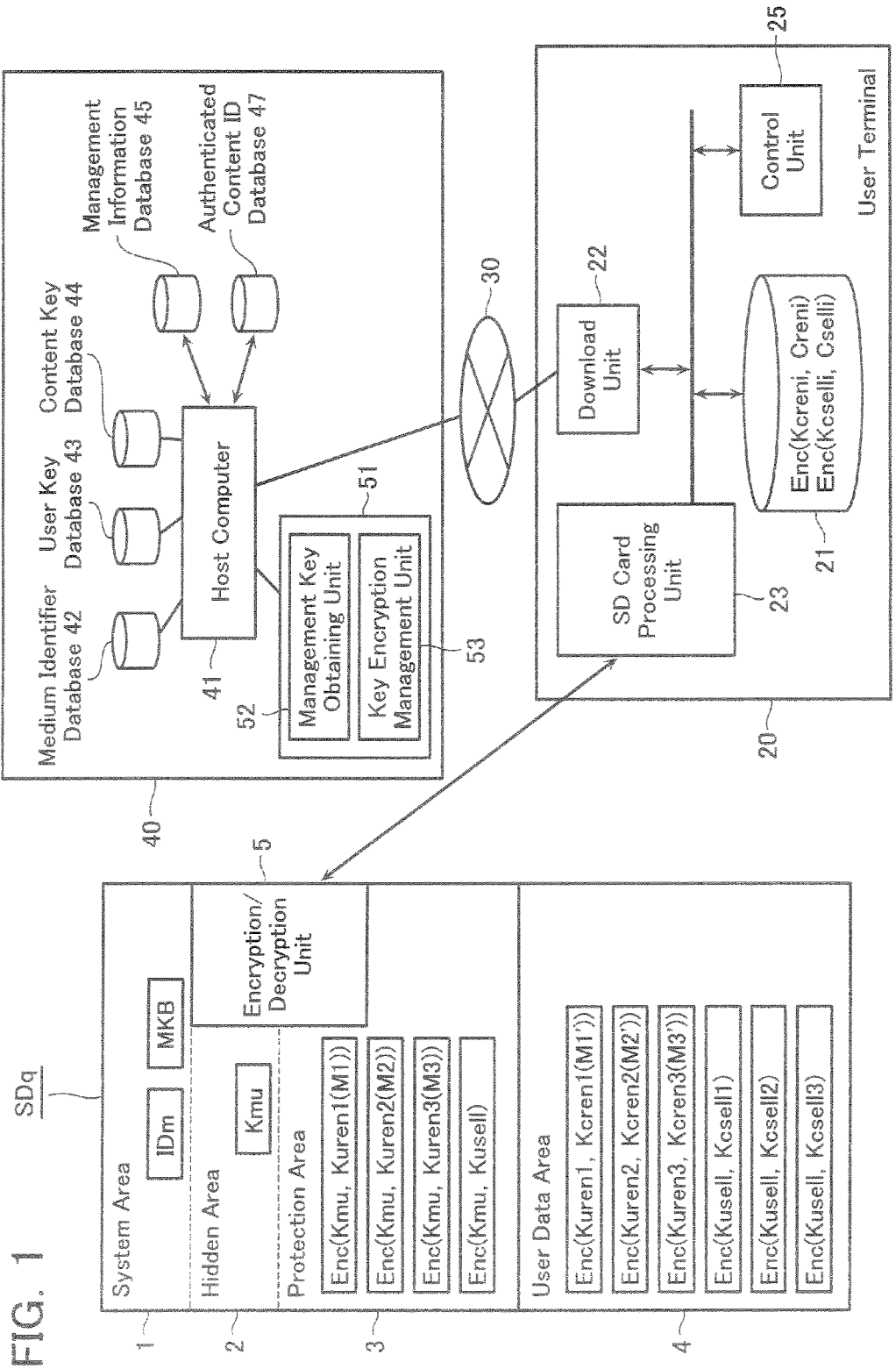
FIG. 1 is a diagram showing the configuration of the storage-medium processing system concerning the embodiment of the present invention.
Figure 2:
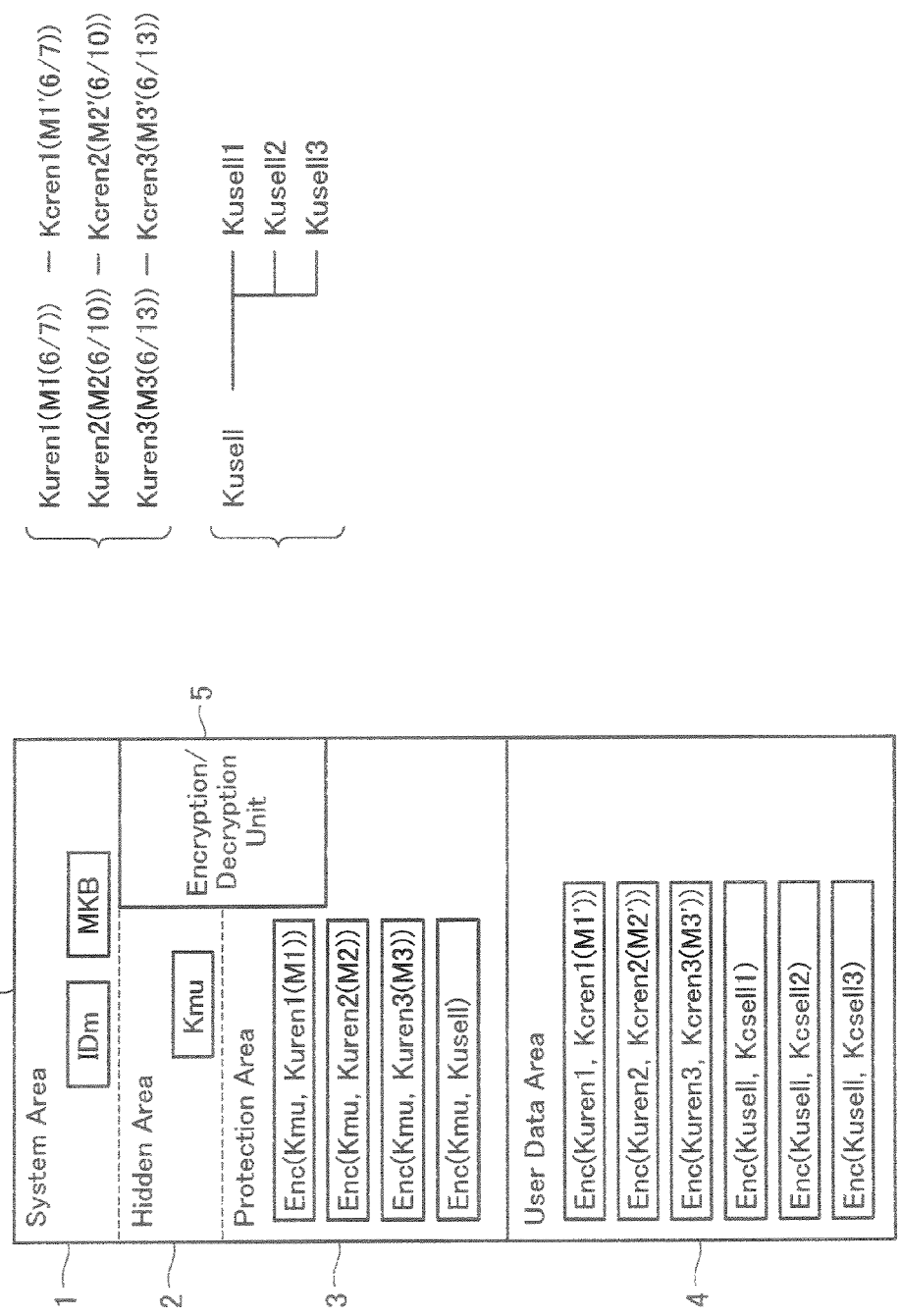
FIG. 2 explains various data stored in the SD card SDq.
Figure 5A:
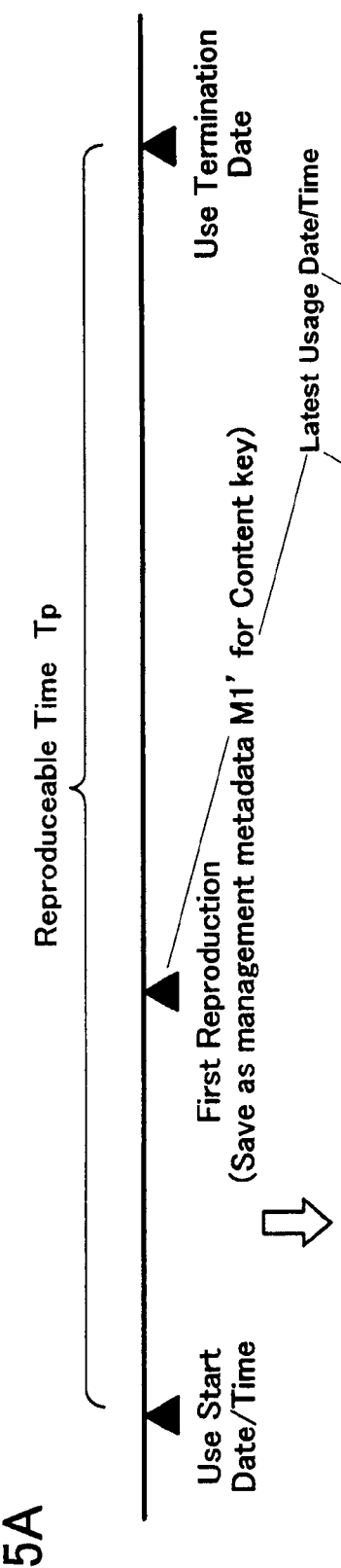
FIG. 5 explains a method of preventing the improper use of the content data using data of "a use start date/time", data of "a use-termination date/time", and data of "the latest usage date/time" in the management metadata Mi and Mi'.
Figure 5B:
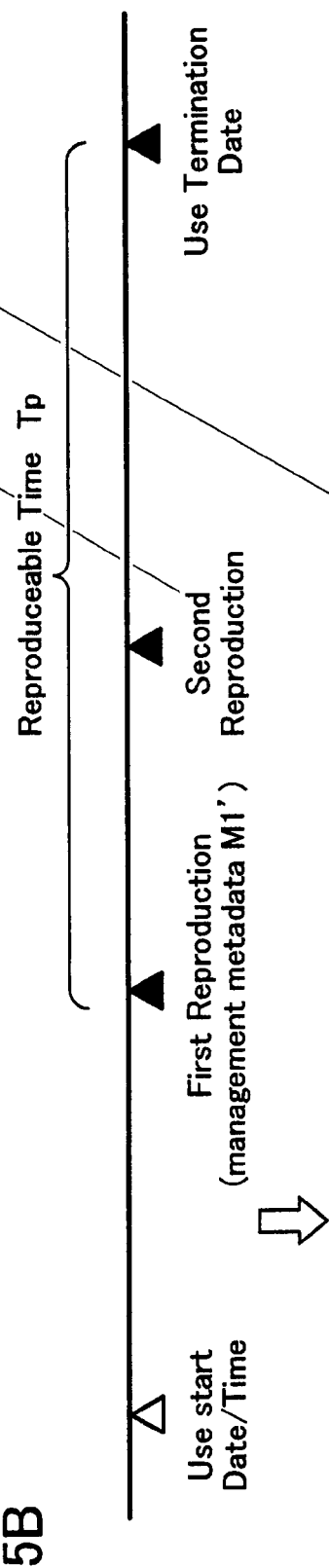
Figure 5C:
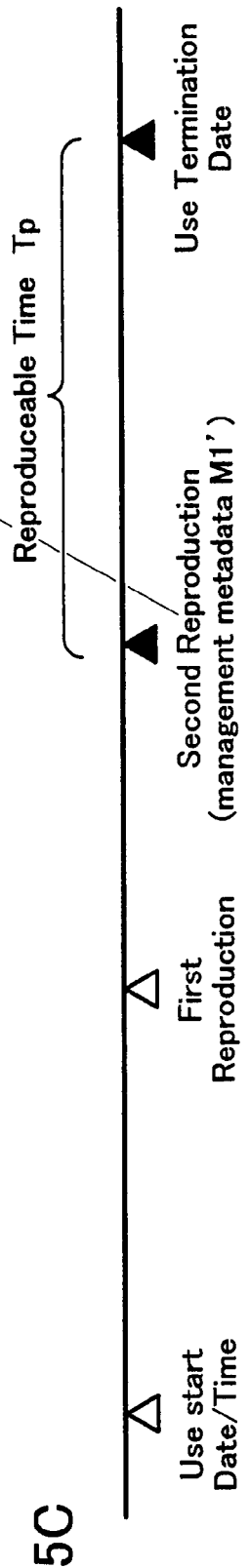
Figure 7:
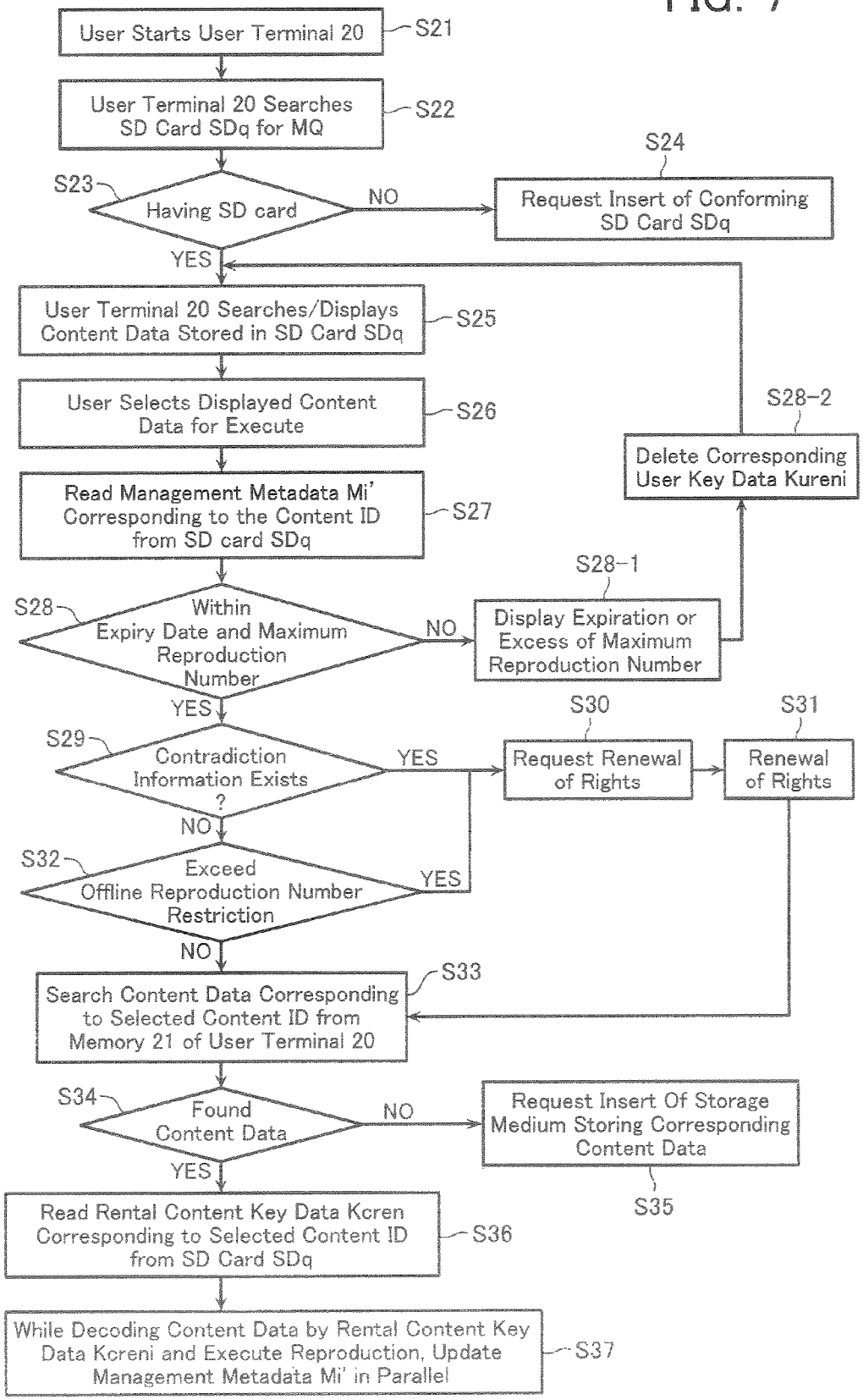
FIG. 7 explains a reproduction process of the content data.
Figure 8:
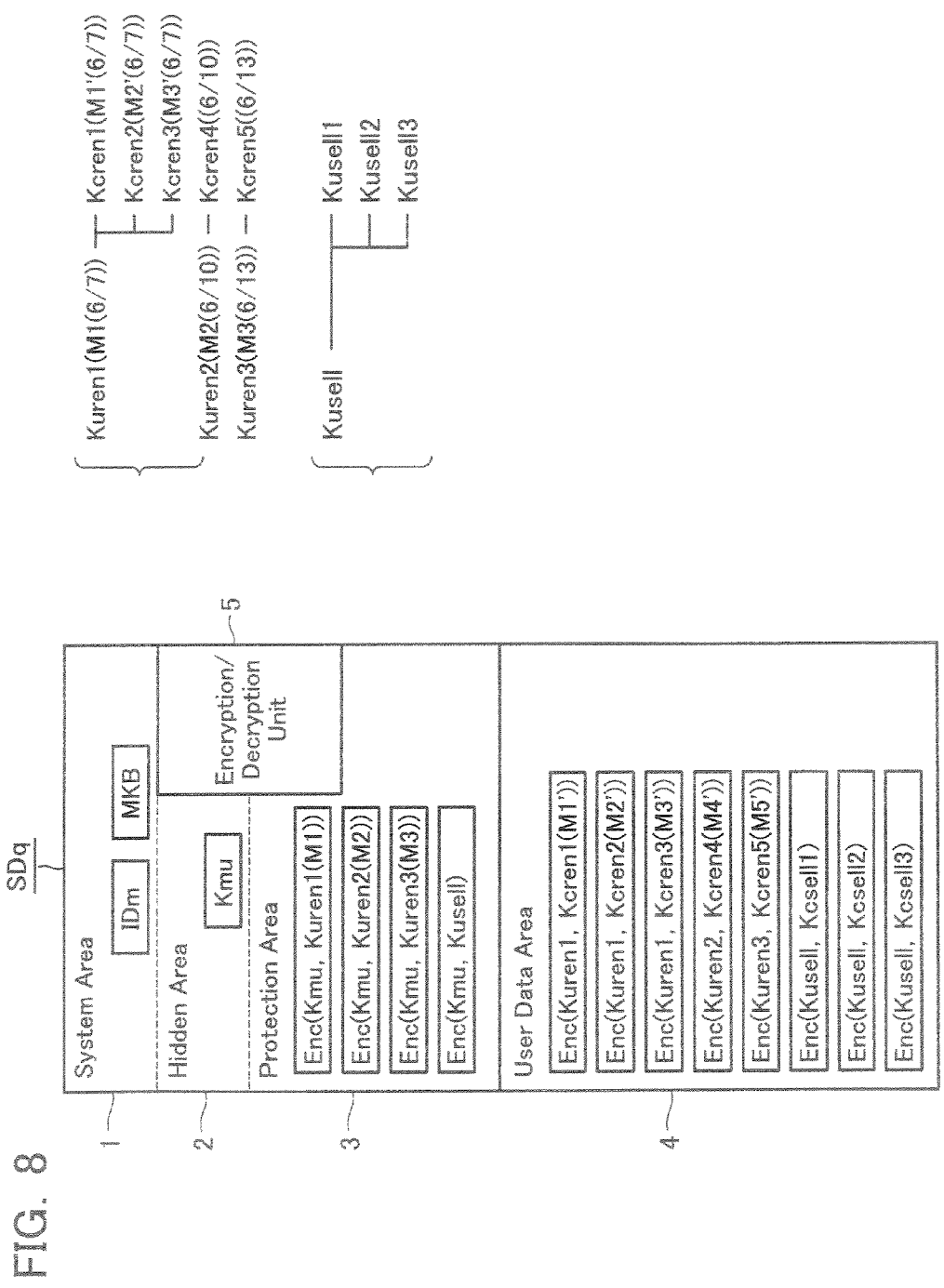
FIG. 8 explains another example of various data stored in the SD card SDq.
Figure 9:
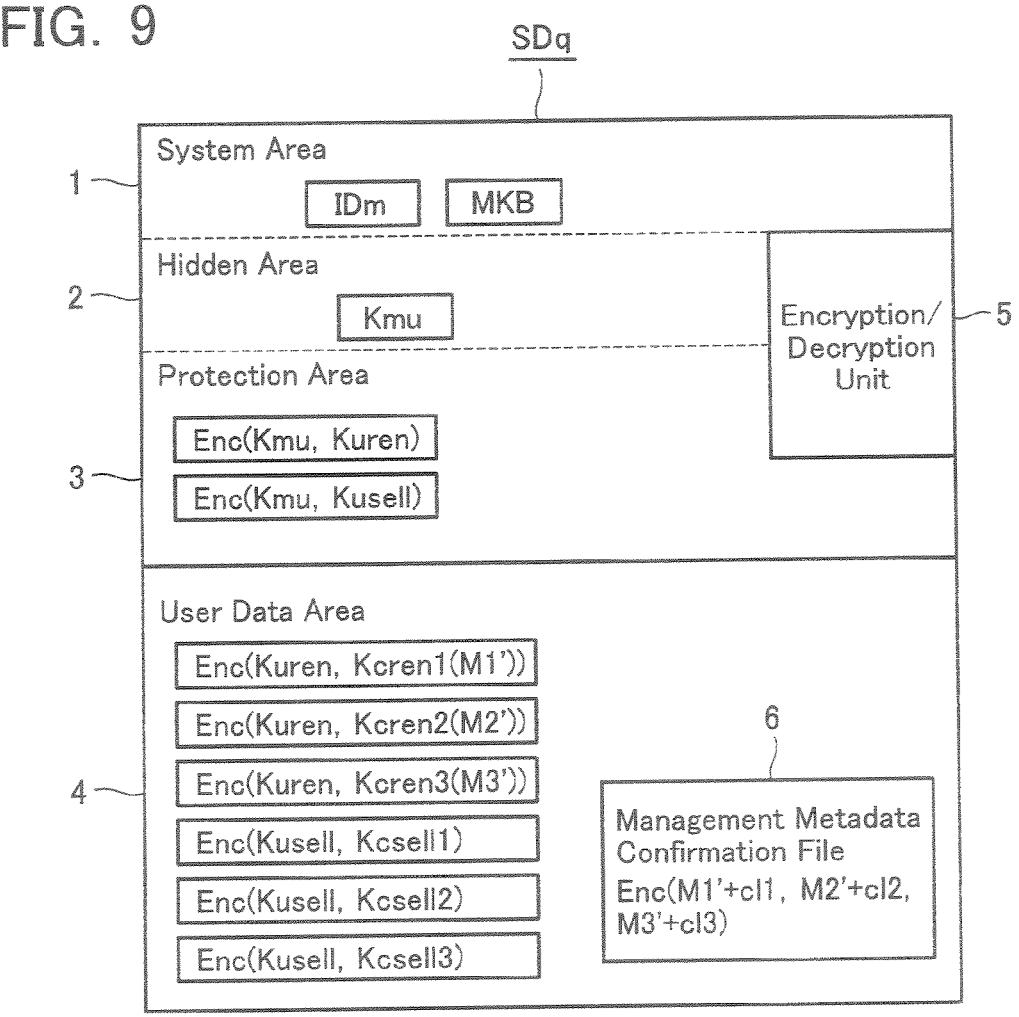
FIG. 9 explains another example of various data stored in the SD card SDq.
Figure 10:
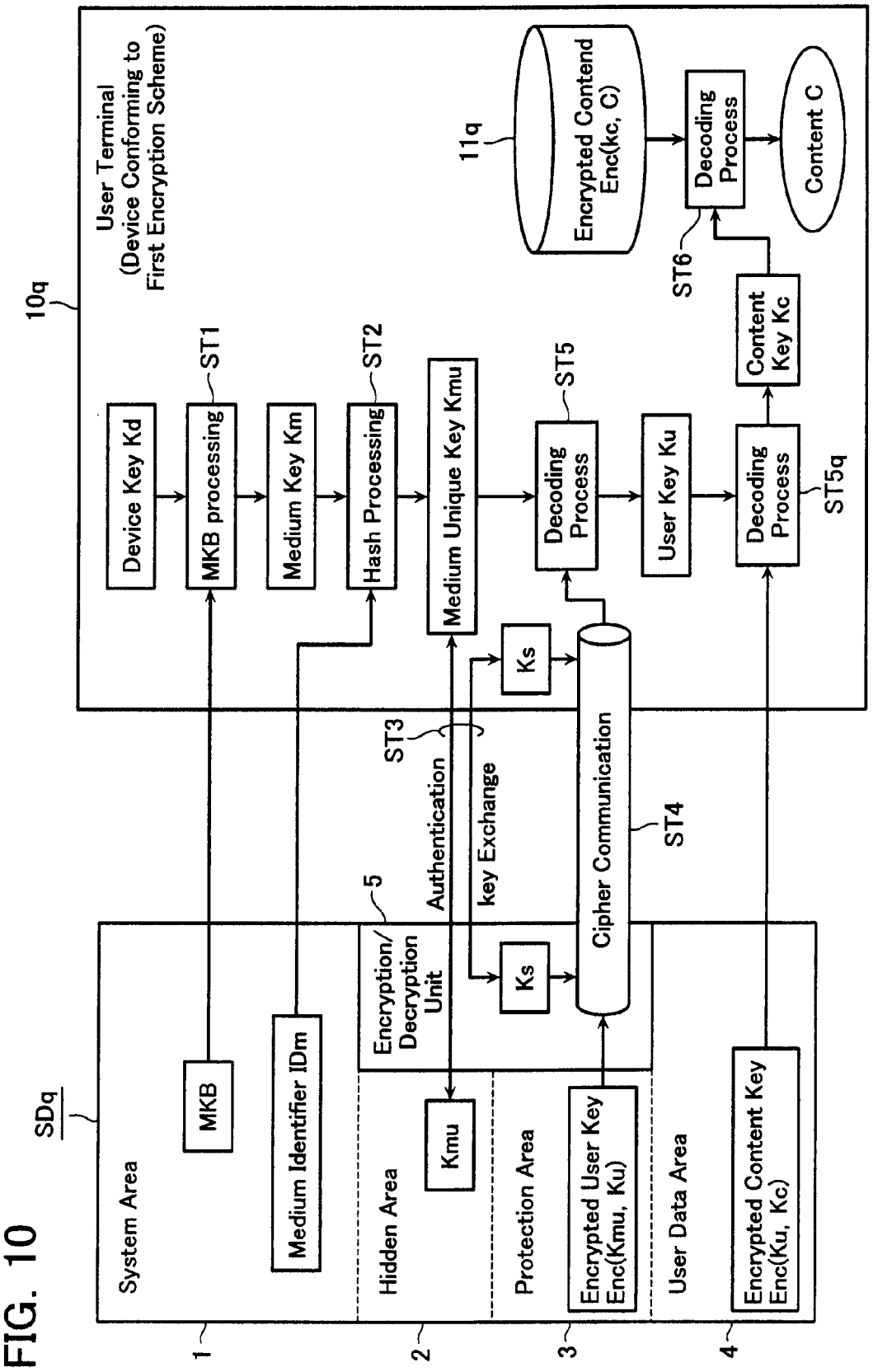
FIG. 10 is a diagram showing the configuration of the SD card corresponding to the encryption double key scheme conventionally adopted in MQbic, and a user terminal.

SDq . . . an SD card
1 . . . a system area
2 . . . a hidden area
3 . . . a protection area
4 . . . a user data area
5 . . . a encryption/decryption unit
20 . . . a user terminal
21 . . . a memory
22 . . . a download unit
23 . . . a SD card processing unit
25 . . . a control unit
40 . . . a license center unit
41 . . . a host computer
42 . . . a medium key database
43 . . . a user key database
44 . . . a content key database
45 . . . a management information database
47 . . . an authenticated content ID database
51 . . . The security module
52 . . . a management key obtaining unit
53 . . . a key encryption management unit

The invention claimed is:

1. A storage medium processing method using a storage medium and a user terminal, the method comprising:
storing, in the storage medium, medium identifier data, medium unique key data generated based on the medium identifier data, encrypted user key data in which user key data is encrypted so that the encrypted user key data may be decrypted using the medium unique key data, and encrypted content key data in which content key data is encrypted so that the encrypted content key data may be decrypted using the user key data;
storing, in the storage medium, the encrypted user key data in a protection area, and storing the encrypted content key data in a user data area, the storage medium including the protection area in which data read/write is permitted from outside of the storage medium in response to authentication being accomplished, and including the user data area in which data read/write is permitted from outside of the storage medium;

retaining, in the user terminal, encrypted content data in which content data is encrypted so that the encrypted content data may be decrypted using the content key data; and accessing, using the user terminal connected to the storage medium, a license center to obtain various kinds of data;

an issuance step of issuing, in response to request from the user terminal, the content key data and the user key data with management data including data of an expiration date of the content key data or the user key data permitting use of the content data before a certain expiration date;

a judgment step of judging whether or not the user key data or the content key data may be used continuously by referring to the management data; and a deleting/use-precluding step of deleting or precluding usage of the user key data or the content key data based on the judging result of the judgment step, wherein the user key data is issued so as to be shared by plural sets of the content key data, each of the plural sets having the same expiration date as that of the user key data shared among them.

2. The storage medium processing method according to claim 1, wherein the issuance step includes a step of detecting an error of time indicated by a clock in the user terminal, and if the error is less than a predetermined value, an issuance of the content key data and the user key data is permitted.

3. The storage medium processing method according to claim 1, wherein the management data includes latest reproduction date/time data indicating a latest reproduction date/time of the content data, when the time the reproduction request of the content data was made is before the data of the latest reproduction date/time, contradiction information is generated to reject a reproduction of the content data thereafter.

4. The storage medium processing method according to claim 1, wherein the judgment step and the deleting/use-precluding step is performed by the license center while the user terminal accessed the license center.

5. The storage medium processing method according to claim 1, wherein the judgment step and the deleting/use-precluding step is performed regularly by the user terminal.

6. The storage medium processing method according to claim 1, wherein the management data includes information on an address of the storage medium where the content key data is stored, and the judgment step judges the propriety of continuous usage based on information on the consistence/inconsistence of the address information.

7. A storage medium processing device configured to be connectable to a storage medium which stores medium identifier data, medium unique key data generated based on the medium identifier data, encrypted user key data in which user key data is encrypted so that the encrypted user key data may be decrypted using the medium unique key data, and encrypted content key data in which content key data is encrypted so that the encrypted content key data may be decrypted using the user key data, and performs data processing of the storage medium via a user terminal retaining encrypted content data in which content data is encrypted so that the encrypted content data may be decrypted using the content key data, the storage medium includes a protection area in which data read/write is permitted from outside of the storage medium in response to authentication being accomplished, and a user data area in which data read/write is permitted from outside of the storage medium, and is configured to store the encrypted user key data in the protection area, and to store the encrypted content key data in the user data area, the device comprising:

a key issuance unit configured to issue, in response to request from the user terminal, the content key data and the user key data with management data including data of an expiration date of the content key data or the user key data permitting use of the content data before a certain expiration date; and a judgment unit configured to judge whether or not the user key data or the content key data may be used continuously referring to the management data, and conduct an instruction to delete the user key data or the content key data or preclude usage of the user key data or the content key data when the continuous usage thereof is judged improper, wherein the user key data is issued so as to be shared by plural sets of the content key data, each of the plural sets having the same expiration date as that of the user key data shared among them.

8. The storage medium processing device according to claim 7, wherein the key issuance unit is configured to detect an error of time indicated by a clock in the user terminal, and if the error is less than a predetermined value, issues the content key data and the user key data.

9. The storage medium processing device according to claim 7, wherein the management data includes latest reproduction date/time data indicating a latest reproduction date/time of the content data, when the time the reproduction request of the content data was made is before the data of the latest reproduction date/time, contradiction information is generated to reject a reproduction of the content data thereafter.

10. The storage medium processing device according to claim 7, wherein the management data includes information on an address of the storage medium where the content key data is stored, and the judgment unit is configured to judge the propriety of continuous usage based on information on the consistence/inconsistence of the address information.

11. A user terminal configured to be connectable to a storage medium which stores medium identifier data, medium unique key data generated based on the medium identifier data, encrypted user key data in which user key data is encrypted so that the encrypted user key data may be decrypted using the medium unique key data, and encrypted content key data in which content key data is encrypted so that the encrypted content key data may be decrypted using the user key data, configured to be enabled to access to a license center to obtain various kinds of data, and configured to retain encrypted content data in which content data is encrypted so that the encrypted content data may be decrypted using the content key data, the storage medium includes a protection area in which data read/write is permitted from outside of the storage medium in response to authentication being accomplished, and a user data area in which data read/write is permitted from outside of the storage medium, and is configured to store the encrypted user key data in the protection area, and to store the encrypted content key data in the user data area, the user terminal comprising:

a download unit downloading the content key data and the user key data with management data including data of an expiration date of the content key data or the user key data receiving permission to use the content data before a certain expiration date, a processing unit that writes the encrypted user key data and the content key data in the storage medium or reads the encrypted user key data and the content key data from the storage medium, and deletes or precludes use of the user key data or the content key data having the certain expiration date which elapsed, wherein the user key data is issued so as to be shared by plural sets of the content key data, each of the plural sets having the same expiration date as that of the user key data shared among them.

12. The user terminal according to claim 11, wherein the processing unit updates the management data when a predetermined process is conducted against the content data.

13. The user terminal according to claim 12, wherein the processing unit updates the management data when the content data is used.

* * * * *